(12) United States Patent  
Baumgart et al.

(10) Patent No.: US 7,016,139 B2  
(45) Date of Patent: Mar. 21, 2006

(54) MAGNETIC RECORDING DISK DRIVE WITH ACTIVELY CONTROLLED ELECTRIC POTENTIAL AT THE HEAD/DISK INTERFACE FOR WEAR AND DURABILITY CONTROL

(75) Inventors: Peter Michael Baumgart, San Jose, CA (US); Bernhard Knigge, San Jose, CA (US); Mathew Mate, San Jose, CA (US)

(73) Assignee: Hitachi GLobal Storage Netherlands B.V., Amsterdam (NL)

( * ) Notice: Subject to any disclaimer, the term of this patent is extended or adjusted under 35 U.S.C. 154(b) by 3 days.

(21) Appl. No.: 10/691,752

(22) Filed: Oct. 22, 2003

(65) Prior Publication Data

US 2005/0088772 A1   Apr. 28, 2005

(51) Int. Cl.  
*G11B 21/02* (2006.01)

(52) U.S. Cl. .............................. 360/75; 360/31; 360/25

(58) Field of Classification Search .................. 360/69, 360/75, 78.05, 25, 31  
See application file for complete search history.

(56) References Cited

U.S. PATENT DOCUMENTS

| | | | | |
|---|---|---|---|---|
| 5,153,785 A | * | 10/1992 | Muranushi et al. | ............ 360/75 |
| 5,546,374 A | * | 8/1996 | Kuroda et al. | ............... 369/126 |
| 6,005,739 A | * | 12/1999 | Yun | ......................... 360/77.04 |
| 6,501,606 B1 | * | 12/2002 | Boutaghou et al. | ............ 360/25 |
| 6,529,342 B1 | * | 3/2003 | Feng et al. | ..................... 360/75 |
| 6,577,466 B1 | * | 6/2003 | Meyer et al. | ................... 360/75 |
| 6,700,724 B1 | * | 3/2004 | Riddering et al. | ............. 360/69 |
| 6,785,081 B1 | * | 8/2004 | Chapin et al. | ................. 360/75 |
| 6,888,693 B1 | * | 5/2005 | Boutaghou et al. | ............ 360/75 |
| 2002/0097517 A1 | * | 7/2002 | Bonin et al. | ................... 360/75 |
| 2003/0043497 A1 | * | 3/2003 | Riddering et al. | ............. 360/75 |
| 2003/0102218 A1 | * | 6/2003 | Kiely et al. | .................. 204/547 |

OTHER PUBLICATIONS

J.D. Kiely et al., "Tribocharging of the magnetic hard disk drive head-disk interface," Journal of Applied Physics, vol. 91, No. 7, Apr. 1, 2002, pp. 4631-4636.

* cited by examiner

*Primary Examiner*—David Hudspeth  
*Assistant Examiner*—Dismery Mercedes (57) ABSTRACT

An electrical potential difference between a slider body and a hard disk of a hard disk drive is eliminated based on the flying-height spacing of the slider body between the slider body and the hard disk. A predetermined bias voltage is applied between the slider body and the hard disk that includes a DC component and an AC component and that is based on the detected flying-height spacing of the slider body. The flying-height spacing can be detected based a minimum slider-to-disk clearance change from a design flying height of the slider at a frequency of the AC component as the DC component of the predetermined bias voltage is varied. Alternatively, the flying-height spacing can be detected based on a minimum electrodynamic response of the slider to a first harmonic of the AC frequency of the AC component as the DC component is varied.

22 Claims, 8 Drawing Sheets

PRIOR ART

MAGNETIC RECORDING DISK DRIVE WITH ACTIVELY CONTROLLED ELECTRIC POTENTIAL AT THE HEAD/DISK INTERFACE FOR WEAR AND DURABILITY CONTROL

CROSS-REFERENCE TO RELATED APPLICATION

The present application is related to co-pending and co-assigned patent application Ser. No. 10/691,742 entitled "Method For Actively Controlling Electric Potential At The Head/Disk Interface Of A Magnetic Recording Disk Drive," which is filed concurrently herewith and is incorporated by reference herein.

BACKGROUND OF THE INVENTION

1. Field of the Invention

The present invention relates to hard disk drives (HDDs). More particularly, the present invention relates to a technique for detecting and eliminating an electrical potential difference between a slider body and a disk surface of an HDD, such as a contact potential caused by material differences between the slider and the disk or a potential generated by tribocharging.

2. Description of the Related Art

Figure 1:
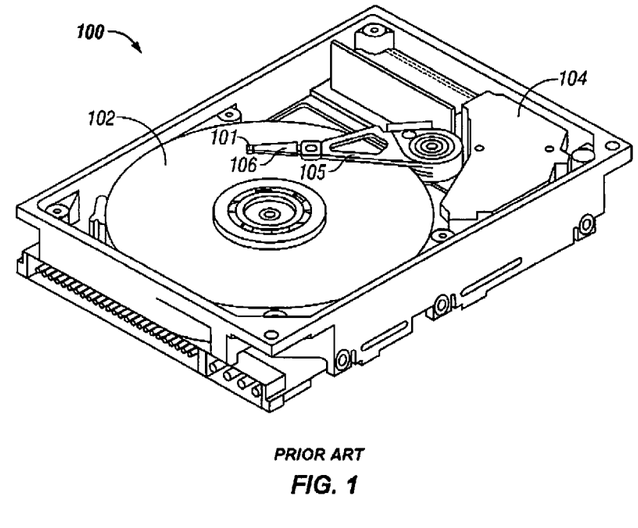
FIG. 1 shows an exemplary hard disk drive.

FIG. 1 shows an exemplary hard disk drive (HDD) 100 having a dual-stage servo system for positioning a slider assembly 101 over a selected concentric data information track on a magnetic disk 102 for writing data to and/or reading data from the selected track. The dual-stage servo system of HDD 100 includes a primary actuator 104, such as a rotary voice-coil motor (VCM), for coarse positioning an actuator arm 105 and a read/write head suspension 106, and a secondary actuator (not shown in FIG. 1), such as a microactuator or micropositioner, for fine positioning slider assembly 101 over a selected track. A microactuator, as used herein, is a small actuator that is placed between a suspension and a slider and moves the slider relative to the suspension. Slider assembly 101 includes a read/write head (not shown in FIG. 1) having a read element, such as a Giant Magnetoresistive (GMR) element, and a write element that respectively read data from and write data to a selected data track. While HDD 100 is shown as having only a single magnetic disk 102, HDDs typically have a plurality of stacked, commonly rotated, rigid magnetic disks and a corresponding number of actuator arms, read/write head suspensions, secondary actuators and slider assemblies.

As slider-to-disk spacing becomes smaller than 10 nm, electrostatic and intermolecular forces between a slider and a disk become increasingly significant. Even when a slider body and a disk are both grounded, a potential difference can exist between the slider body and the disk that can generate an electrostatic force greater than the van der Waals force. One source of the potential difference is tribocharging, or frictional electrification of non-conducting materials on the slider body. (See, for example, J. D. Kiely et al., "Tribocharging of the magnetic hard disk drive head-disk interface," Journal of Applied Physics, Vol. 91, No. 7, pp. 4631–4636, Apr. 1, 2002.) Another source is the contact potential between the conducting materials of the slider body and the disk.

Figure 2:
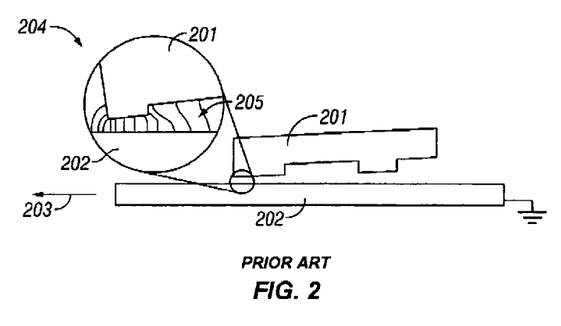
FIG. 2 depicts an electrostatic field that can exist between a slider body and a hard disk of a hard disk drive.

FIG. 2 depicts an electrostatic field that can exist between a slider body 201 and a hard disk 202 of a hard disk drive. A suspension supporting slider body 201 is not shown. As disk 202 rotates, disk 202 moves from right to left with respect to slider body 201, as indicated by arrow 203. Enlargement 204 of the slider-disk interface shows lines representing an electric field 205 that is formed from a potential difference between slider body 201 and disk 202. Electric field 205 exists between slider body 201 and disk 202 all along the length of slider body 202, but is only indicated in enlargement 204 because the intensity of electric field 205 is greatest at the trailing edge of slider body 201. As mentioned, one source for the potential difference is the contact potential that originates from the conducting portions of the slider body and disk having different work functions and from tribocharging of the non-conducting portions. Another source for the potential difference is tribocharging associated with the spindle motor bearing, which can shift the disk potential significantly from ground potential.

Electric field 205 between slider body 201 and disk 202 generates an electrostatic force that acts the on the surfaces of slider body 201 and disk 202 within the slider-disk interface. The electrostatic force associated with electric field 205 depends on the applied voltage and the other physical parameters of the slider-disk interface. As the potential difference between the slider body and the disk increases, the slider flying height is reduced from the design flying height of the slider.

Figure 3:
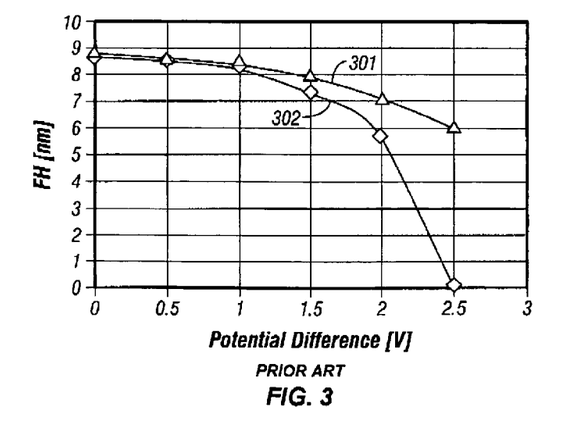
FIG. 3 shows the flying height for two different air bearing designs as a function slider-disk potential difference.

For example, FIG. 3 shows the flying height (FH) for a high-pitch air bearing design and a low-pitch air bearing design as a function slider-disk potential difference. Both air bearing designs have a design fly height 9 nm above a disk. The high-pitch slider has a dynamic pitch angle of 180 $\mu$rad. The low-pitch slider has a dynamic pitch angle of 70 $\mu$rad at a flying height of 9 nm. Curve 301 represents the flying height for the high-pitch slider as a function of the slider-disk potential difference. Curve 302 is the flying height for a low-pitch slider as a function of the slider-disk potential difference. The low-pitch slider is more sensitive to an applied DC electric field than a high-pitch slider because a low pitch design has on average a smaller separation distance than a high-pitch design when the electrostatic force is integrated over the slider. The flying height is reduced by about 0.5 nm for a potential difference of about 0.5 V for both the high-pitch and low-pitch air bearing designs. The value of the flying height at 2.5 V for the low-pitch slider is extrapolated to 0 nm because contact occurs at 2.5 V.

In current hard drives, the disks are lubricated using perfluoropolyether-type lubricants having long polar chains, such as Fomblin Z-DOL. The polarity of the lubricant in the presence of an electrostatic field at the head-disk interface can cause lubricant to be removed from the disk surface and possibly be depleted from the disk surface. The removed lubricant is usually picked up by the slider and can lead to drive failure. Consequently, as lubricant is removed, the lubricant is attracted to slider body 201 by the polarity of the lubricant and the electrostatic force and becomes concentrated in areas on slider body 201 that have a high electric field, such as the trailing edge of the slider body. Once concentrated, the lubricant can form droplets that can lead to read/write errors when the droplets of lubricant enter the head-disk interface. Electric field 205 can also attract particles onto slider body 201 that can lead to scratches on both slider body 201 and the surface of disk 202. Yet another potential problem that is caused by the electrostatic force is an increased vibrational coupling between slider body 201 and disk 202, leading to larger modulations of the slider-disk spacing.

A number of researchers have found over the past years that slider-to-disk spacing can be controlled by adjusting a DC bias applied to the slider-disk interface. See, for example, U.S. Pat. Nos. 6,005,736 to E. T. Schreck; U.S. Pat. No. 6,529,342 to Z. Feng et al.; and U.S. Pat. No. 6,366,416 B1 to D. W. Meyer et al.

Accordingly, what is needed is a technique for determining the optimum bias voltage that should be applied between a slider body and a disk for eliminating an electrical potential difference that exists between the slider body and the disk, such as a contact potential.

BRIEF SUMMARY OF THE INVENTION

The present invention provides a technique for determining the optimum bias voltage that should be applied between a slider body and a disk for eliminating an electrical potential difference that exists between the slider body and the disk, such as a contact potential.

The advantages of the present invention are provided by a system and a method for eliminating an electrical potential difference between a slider body and a hard disk of a hard disk drive. According to the present invention, a flying-height spacing of the slider body between the slider body and the hard disk is detected. A predetermined bias voltage is applied between the slider body and the hard disk that includes a DC component and an AC component and that is based on the detected flying-height spacing of the slider body. One aspect of the present invention provides that the flying height spacing of the slider body is detected based on determining a minimum slider-to-disk clearance change from a design flying height of the slider at a frequency of the AC component as the DC component of the predetermined bias voltage is varied. Another aspect of the present invention provides that the flying height spacing of the slider body is detected based on detecting a minimum electrodynamic response of the slider to a first harmonic of the AC frequency of the AC component as the DC component is varied. Still another aspect of the present invention provides that the flying-height of the slider body is detected based on a minimum interference between the slider body and the hard disk at a frequency of the AC component as the DC component is varied.

One embodiment of the present invention detects the flying-height spacing of the slider body using a Laser Doppler Vibrometer. Another embodiment of the present invention detects the flying-height spacing of the slider body based on a magnitude of magnetic readback signal that is sensed by a read element on the slider body at the frequency of the AC component as a magnitude of the DC component is varied. For these embodiments of the present invention, the AC component can be a swept-frequency AC signal or a single-frequency AC signal. Yet another embodiment of the present invention detects the flying-height of the slider body based on a minimum variation of current that flows on and off the slider body as the DC component of the bias voltage is varied. Still another embodiment of the present invention detects the flying-height spacing of the slider body is based on a minimum resistance of a magnetoresistive element as the DC component is varied. A further embodiment of the present invention detects the flying-height spacing of the slider body based on an output of a piezoelectric sensor or an acoustic emission sensor sensing contact between the slider body and the hard disk as the DC component is varied.

The magnitude of the predetermined voltage can be controlled based on the detected flying-height spacing of the slider body, such as by determining a minimum slider-to-disk clearance change from the design flying height of the slider as the DC component is varied, or by determining a minimum interference between the slider body and the hard disk as the DC component is varied. Alternatively, the magnitude of the predetermined voltage can be controlled so that an amplitude of a variation of the flying-height spacing times a sine of a phase difference of the flying-height spacing at a frequency of the AC component is a minimum.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique for determining the optimum bias voltage that should be applied between a slider body and a disk for eliminating an electrical potential difference that exists between the slider body and the disk, such as a contact potential caused by tribocharging or by the material differences of slider and disk. By eliminating the electric field between the slider body and the disk, the slider flying height is increased to the maximum design flying height of the slider. Removal and depletion of lubricant from the disk surface caused by electrostatic forces are also eliminated. Accordingly, because lubricant is not removed from the disk, lubricant does not become concentrated in areas on the slider body and lubricant droplets do not form. Consequently, read/write errors caused by lubricant droplets in the head-disk interface are avoided. Further, vibrational coupling between the slider body and the disk is reduced because the electrostatic force between the slider body and disk has been eliminated, thereby eliminating slider-disk spacing modulations.

According to the present invention, a bias voltage having a DC component plus a swept-frequency AC component is applied between a slider body and a disk, and the minimum electrodynamic response of the slider to the first harmonic of the swept-frequency AC component, which is preferably is within the range of the air bearing (i.e., 50 kHz to 500 kHz), is detected as the magnitude of the DC component is varied for determining the contact voltage between the slider and the disk. Alternatively, the AC component of the bias voltage has a fixed frequency, which is preferably within the range of the air bearing (i.e., 50 kHz to 500 kHz). The range that the magnitude of the DC component can be varied can be about −5.0 V DC to about +5.0 V DC with a current limitation of about 1 μA. The magnitude of the AC component should preferably not exceed about 300 mV.

A first aspect of the present invention utilizes the slider body and a hard disk as a Kelvin probe to determine the optimum DC bias voltage that should be applied between the slider body and the hard dick by detecting the minimum electrodynamic response of the slider to the first harmonic of the AC frequency of the AC component of the bias voltage as the DC component of the bias voltage is varied. The minimum electrodynamic response of the slider can be detected using an external Laser Doppler Vibrometer (LDV) or laser interferometer and/or by monitoring the magnitude of a readback signal at the frequency of the AC component of the bias voltage. A second aspect of the invention provides that the optimum DC bias voltage that should be applied between a slider body and a disk is determined by detecting the magnitude of the current fluctuations that flow on and off of the slider as the DC bias voltage is varied. A third aspect of the present invention provides that the optimum DC bias voltage that should be applied between a slider body and a disk is determined by detecting interference between the slider and the disk. It should be understood that throughout the description of the present invention, phrases such as "maximum slider-disk spacing" or "maximum flying height of the slider" should be understood to mean the design flying height of the slider.

Figure 4:
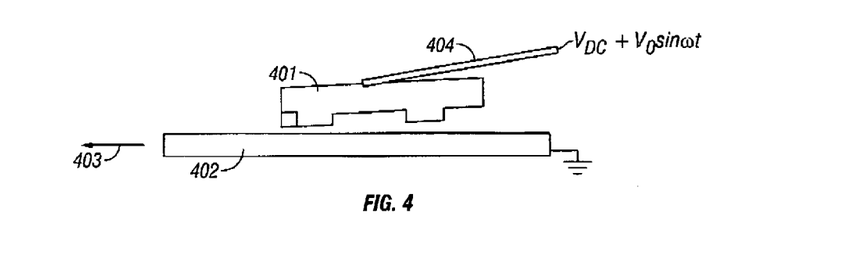
FIG. 4 depicts the general concept for all embodiments of the present invention for determining the optimum DC bias voltage that should be applied to a slider body for eliminating an electrical potential difference between a slider body and a hard disk.

FIG. 4 depicts the general concept of all embodiments of the present invention for determining the optimum DC bias voltage that should be applied to a slider body for eliminating an electrical potential difference between a slider body 401 and a hard disk 402. As disk 402 rotates, disk 402 moves from right to left with respect to slider body 401, as indicated by arrow 403. A suspension 404 supports slider body 401. While disk 402 is indicated as being at ground potential, it should be understood that disk 402 can have a potential difference relative to the rest of the HDD or slider body, such as that caused by tribocharging of the spindle motor bearing. The embodiments would also work when the DC and AC voltages were applied to the disk rather than to the slider body. A DC bias voltage $V_{DC}$ plus an AC bias voltage $V_0 \sin \omega t$ are applied to slider body 401 through suspension 404. At a given AC frequency, the DC bias voltage is varied to determine the minimum amount of slider/disk interference.

The first two embodiments of the present invention utilize the slider body and the hard disk as a Kelvin probe to determine the optimum DC bias voltage that should be applied between the slider and the hard disk for eliminating an electrical potential difference that exists between the slider body and the disk, such as a contact potential caused by tribocharging. Generally, a Kelvin probe is a capacitor having one plate vibrating at an AC frequency and the other plate fixed, similar to a slider body and a hard disk. The optimum DC bias voltage that should be applied between the slider body and the hard disk is determined by detecting the minimum electrodynamic response of the slider to the first harmonic of the AC frequency of the AC component of the bias voltage as the DC component of the bias voltage is varied.

To illustrate the Kelvin probe aspect of the present invention, consider the electrostatic force $F_{el}$ that acts between two parallel conducting plates formed from different materials, which is given by:

$$F_{el} = \frac{\varepsilon_0 \varepsilon_r A}{2d^2} V^2, \quad (1)$$

in which $\varepsilon_0 \varepsilon_r$ is the permeability of the dielectric between the plates, A is the area of the plates, d is the distance of separation of the plates, and V is the potential difference between the plates.

When a slider-disk interface, such as shown in FIG. 4, is modeled by Eq. (1), the potential difference V between the plates, that is, the between slider and the disk, is, for the present invention, the sum of an externally applied bias voltage and an internal contact potential $V_{contact}$. Contact potential $V_{contact}$ is the potential difference between the two plates in the absence of an applied voltage and originates from the plates being made of different materials having different work functions. See, for example, N. W. Ashcroft et al., Chapter 18, Solid State Physics, Holt, Rinehart and Winston, New York, 1976. The work function of a material is the amount of energy that is needed for releasing electrons from the surface of the material, and is related to the optical, electrical and mechanical properties of the material. When two materials having different work functions are brought together, electrons in the material having the higher work function flow to the material having the lower work function. When the materials are made into a parallel plate capacitor, an equal and opposite surface charges form on each material. The voltage formed between the plates of the capacitor from the equal and opposite surface charges is called a "contact potential". For slider-disk interfaces, the conducting part of the slider body is typically sintered $Al_2O_3$—TiC and the conducting part of the disk is typically a cobalt-based alloy magnetic layer. The respective work functions for the materials of the slider body and the conducting part of the disk are further modified by overcoats and lubricants that are deposited for tribology protection.

When one plate (i.e., the conducting part of the disk) is grounded and a bias voltage $V_{bias} = V_{DC} + V_{AC} \sin \omega t$ is applied to the other plate (i.e., the slider body), as shown in FIG. 4, the electrostatic force can be written, after mathematical manipulation, as $$F_{el} = \frac{\varepsilon_0 \varepsilon_r A}{4d^2}[2(V_{DC} + V_{contact})^2 + 4V_{AC}(V_{DC} + V_{contact})\sin\omega t - V_{AC}^2 \cos 2\omega t + V_{AC}^2] \quad (2)$$

The first and last terms within the square brackets in Eq. (2) represent the DC response to the applied bias voltage $V_{bias}$, the second term represents the first harmonic response to $V_{bias}$, and the third term in square brackets represents the second harmonic response to $V_{bias}$. The first harmonic term becomes zero when the DC component of the applied bias voltage $V_{bias}$ cancels the contact potential $V_{contact}$, i.e., $V_{DC} = -V_{contact}$. The second harmonic term, however, is independent of the applied DC voltage. Thus, the optimum DC component of the applied bias voltage $V_{bias}$ can be detected when the first harmonic electrodynamic response of the slider to the AC component of the applied bias voltage $V_{bias}$ equals zero (i.e., no slider vibration at the first harmonic of the applied AC component).

Figure 5:
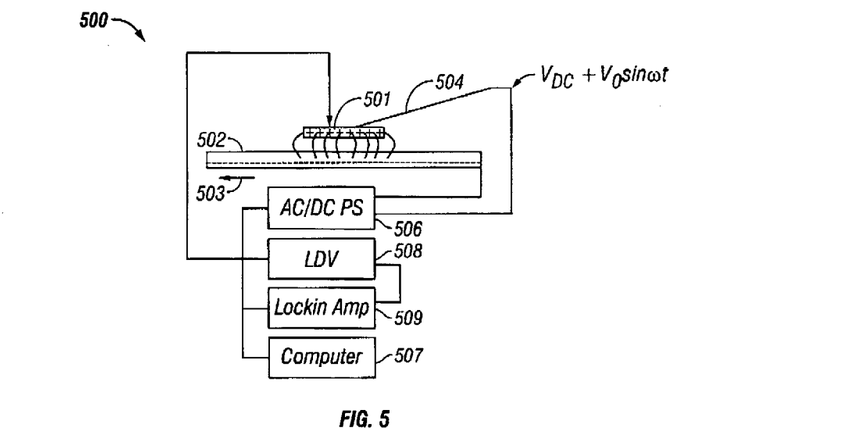
FIG. 5 depicts a system using a Laser Doppler Vibrometer for determining the optimum bias voltage that should be applied between a slider body according to the present invention.

The first embodiment of the present invention provides a technique that is applicable when the disk drive is open. All of the other embodiments of the present invention that will be described herein are applicable when the disk drive is sealed. According to the first embodiment of the present invention, a Laser Doppler Vibrometer (LDV) that is external to the disk drive is used for determining the minimum slider-to-disk clearance change from the design flying height of the slider as the applied bias voltages are varied. FIG. 5 depicts a system 500 for measuring the flying height of a slider with respect to a disk using an LDV. In FIG. 5, a slider body 501 is suspended above a hard disk 502 by a suspension 504 as disk 502 moves from right to left with respect to slider body 501, as indicated by arrow 503. A bias voltage having a DC component $V_{DC}$ plus an AC component $V_0\sin\omega t$ is output from an AC/DC power supply 706 and is applied between slider body 501 and disk 502. The bias voltage is applied to slider body 501 through suspension 504. The bias voltage is varied under the control of computer 507. An LDV 508 measures a velocity of the trailing edge of slider body 501. A lockin amplifier 509 measures first and second harmonics of the LDV velocity signal at the AC driving frequency, which is typically at an air bearing frequency. The first harmonic of the AC driving frequency is minimized when the DC bias voltage cancels the contact potential between slider body 501 and disk 502.

Figure 6A:
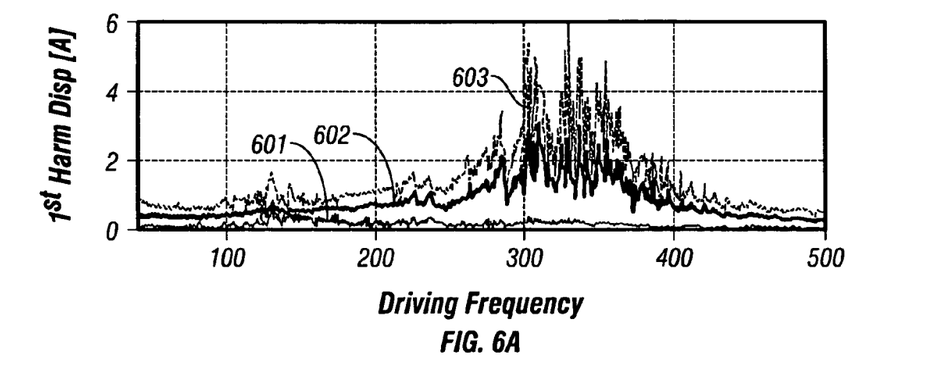
FIGS. 6A and 6B respectively shows the first and second harmonic response of an exemplary slider at the air bearing frequency range for different DC bias voltages.
Figure 6B:
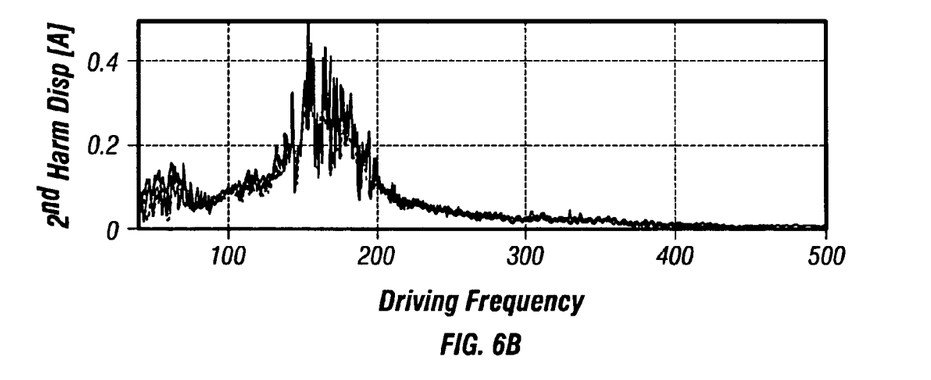

FIGS. 6A and 6B respectively shows the first and second harmonic response of an exemplary slider at the air bearing frequency range (50 kHz to 500 kHz) for DC bias voltages of −0.5 V, 0 V and +0.5 V DC. The magnitude of the AC component of the applied bias voltage for all DC bias voltages was 100 mV. Curve 601 represents the first harmonic response of the slider for an applied bias voltage having a DC component of +0.5 V. Curve 602 represents the first harmonic response of the slider for an applied bias voltage having a DC component of 0 V DC. Curve 603 represents the first harmonic response of the slider for an applied bias voltage having a DC component of −0.5 V DC. The first harmonic response disappears when a DC bias of +0.5 V (curve 601) is applied to the slider body, implying that $V_{contact} = -0.5$ V DC for the slider-disk interface. Moreover, curve 601 verifies that the slider-disk interface behaves like a Kelvin probe. The curves representing the respective responses for the second harmonic of the applied bias voltage remain unchanged for the different applied bias voltages and are essentially indistinguishable from each other. Consequently, the second harmonic responses are not separately indicated. Note that the second pitch mode frequency at ~320 kHz is strongly excited by the AC component of the applied bias voltage, while the first pitch at ~120 kHz is weakly excited.

Figure 7A:
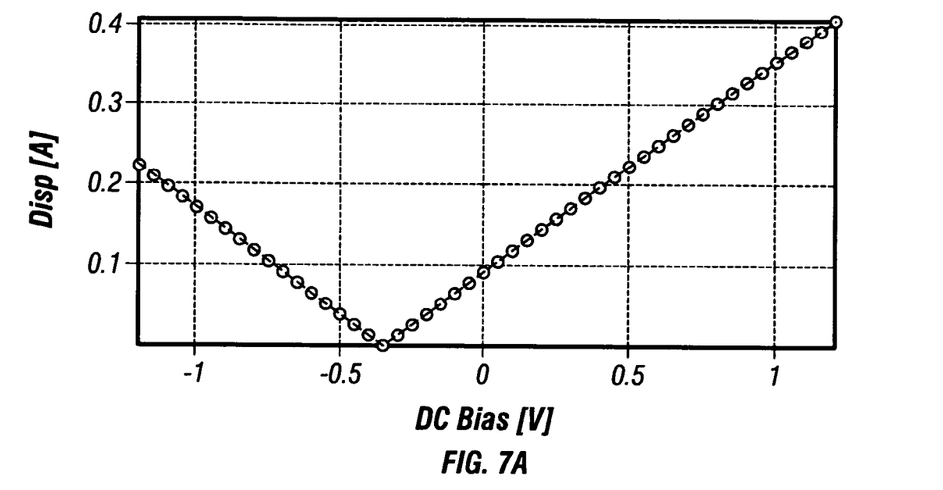
FIGS. 7A and 7B respectively show the first harmonic displacement and phase of an exemplary slider as a function of DC bias voltage at a single AC frequency.
Figure 7B:
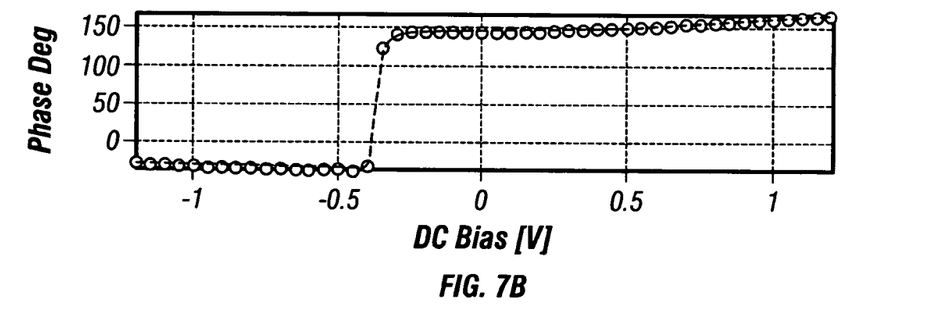

Rather than sweeping through the all air bearing frequencies, the contact potential could also be determined simply by monitoring the value of the DC component of the applied bias voltage and determining when the electrodynamic response to the first harmonic of a single-frequency AC component of the applied bias voltage is minimized. The frequency of the single-frequency AC component should be preferably at a mechanical resonance, such as a suspension resonance, an air bearing resonance or a slider body resonance. For example, a high signal-to-noise ratio is achieved when the frequency is near the pitch 2 mode frequency of a slider air bearing. FIGS. 7A and 7B respectively show the first harmonic displacement and phase of an exemplary slider air bearing resonance as a function of DC bias voltage for a 290 kHz AC bias voltage having a magnitude of about 100 mV. FIG. 7A shows that the DC component of the applied bias voltage is about −0.4 V DC when the electrodynamic response at the first harmonic of a single-frequency AC component of the applied bias voltage is minimized.

According to the second embodiment of the present invention, the minimum slider-to-disk clearance change from the design flying height of the slider based on a relative magnitude of a magnetic readback signal sensed by the read element on slider body 401, shown in FIG. 4. That is, when slider body 401 is correctly positioned over a selected track, the maximum magnitude of the readback signal varies as the applied bias voltages are varied. In particular, the maximum magnitude of the readback signal varies inversely to the flying height of the slider. Thus, when the flying height of the slider is a maximum, that is, at the design flying height of the slider, the maximum magnitude of the readback signal will be a relative minimum. When the flying height of the slider is less than the design flying height of the slider, the maximum magnitude of the readback signal will be greater than when the slider is at the design flying height. For high-pitch sliders, however, the flying height will be changed from the design flying height by about 0.1 nm or less for a contact potential of between 0 V DC and 0.5 V DC. Consequently, a change in the magnitude of the readback signal is likely not detectable. To obtain an improved Signal-to-Noise (SNR) for the readback signal the amplitude of the readback signal must be filtered to be exactly the frequency of the AC component. When a swept-frequency AC component is used, then a frequency selective device, such as a lockin amplifier, can be used. When a single frequency AC component is used, a notch-pass filter at the frequency of the AC component can be used. The DC component is then varied while the filtered readback signal is monitored. When the amplitude of the filtered readback signal is a minimum, the DC component of the applied bias voltage equals the contact potential. According to an alternative configuration of the first embodiment of the present invention, the maximum slider-disk spacing can be identified based on the Position Error Signal (PES) that is generated in a well-known manner. For the third embodiment of the present invention, it is not necessary to use an AC component of the applied bias voltage to determine the optimum DC bias voltage, although nulling the AC component of the change in the flying height is easier to detect using an AC component.

Figure 8:
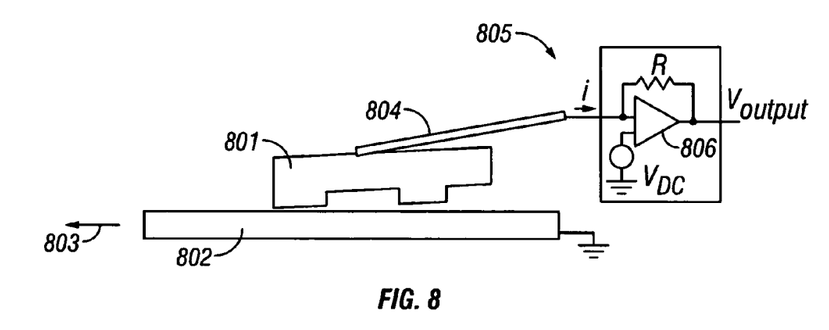
FIG. 8 depicts a first configuration of a third embodiment of the present invention for determining the optimum DC bias voltage that should be applied between a slider body and a hard disk.

A third embodiment of the present invention provides that the optimum DC bias voltage that should be applied to the slider body is detected by identifying the minimum current variation that flows on and off the slider as the DC bias voltage is varied. FIG. 8 depicts a first configuration for the third embodiment of the present invention for determining the optimum DC bias voltage that should be applied to a slider body for eliminating an electrical potential difference between a slider body 801 and a hard disk 802. As disk 802 rotates, disk 802 moves from right to left with respect to slider body 801, as indicated by arrow 803. A suspension 804 supports slider body 801. While disk 802 is indicated as being at ground potential, it should be understood that disk 802 can include an electrical potential relative to the HDD. According to the third embodiment of the present invention for identifying the optimum DC bias voltage, a DC bias voltage $V_{DC}$ is applied to slider body 801 through suspension 804 (AC voltage $V_0=0$) and then is varied to identify the minimum variation in current that flows on and off slider body 801. A current sense circuit 805 is coupled to slider body through suspension 804. Current sense circuit 805 includes an amplifier 806 that is configured in an inverting topology with feedback resistor R. The bias voltage is applied to the non-inverting input of amplifier 806.

Assuming that the tribocurrent is negligible and that the slider-disk resistance is infinite, the current i is given by the relationship: $i=(dC/dt)(V_C+V_{DC})+CdV_C/dt$, in which C is the slider-disk capacitance and $V_C$ is the contact potential. When the disk work function is uniform, $dV_C/dt \approx 0$, and the current i comes mainly from the variation of slider-disk capacitance, which varies due to changes in flying height and pitch. When slider body 801 flies without accessing, the average capacitance is constant and dC/dt varies about zero, so the rms modulation of the current is minimum when $V_C = -V_{DC}$.

Figure 9:
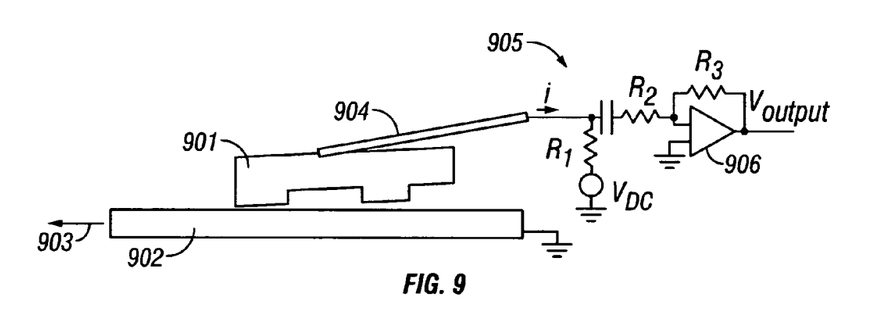
FIG. 9 depicts an alternative configuration of the third embodiment of the present invention for determining the optimum DC bias voltage that should be applied between a slider body and a hard disk.

Current sense circuit 805 in FIG. 8 measures both the DC and AC components of current i. An alternative configuration for the third embodiment of the present invention is shown in FIG. 9, which depicts a slider body 901, a hard disk 902 and a current sense circuit 905 for measuring only the AC component in the variation in current i. As disk 902 rotates, disk 902 moves from right to left with respect to slider body 901, as indicated by arrow 903. A suspension 904 supports slider body 901. While disk 902 is indicated as being at ground potential, it should be understood that disk 902 can include an electrical potential relative to the HDD. Current sense circuit 905 includes an amplifier 906 that is configured in an inverting topology with resistors $R_2$ and $R_3$ setting the gain. A capacitor $C_1$ DC-isolates amplifier 907 from slider body 901 and bias voltage source $V_{DC}$. Resistor $R_1$ isolates bias voltage source $V_{DC}$ from capacitor $C_1$.

Figure 10:
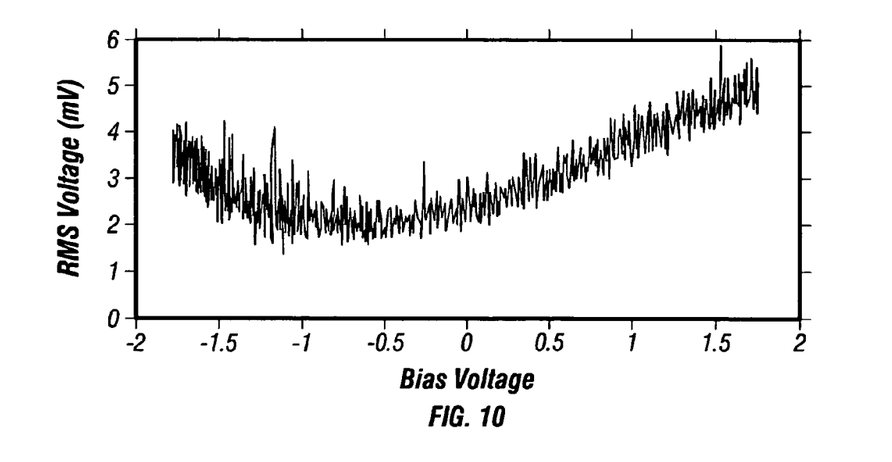
FIG. 10 shows a graph of the rms Voutput for the alternative current sense circuit shown in FIG. 9 when $R_1=8$ M$\Omega$ and $R_2=R_3=1$ M$\Omega$.

FIG. 10 shows a graph of the rms Voutput for alternative current sense circuit 905, shown in FIG. 9, in which $R_1=8$ M$\Omega$ and $R_2=R_3=1$ M$\Omega$. From FIG. 9, it can be observed that the rms current variation goes through a minimum when the DC component $V_{DC}$ of the applied bias voltage is $-0.6\ V_{DC}$.

The fourth and fifth embodiments of the present invention related to determining the optimum DC bias voltage that should be applied between a slider body and a hard disk by detecting the least amount of interference between the slider body and the hard disk. For the forth and fifth embodiments, the AC component of the applied bias voltage can be used to create a slider vibration that is sufficiently large to induce contact between the slider body and the hard disk. When the slider is flying sufficiently close to the disk, for example, 1 to 2 nm above the disk, the AC component of the applied bias voltage would not be necessary to induce contact between the slider body and the hard disk.

Figure 12:
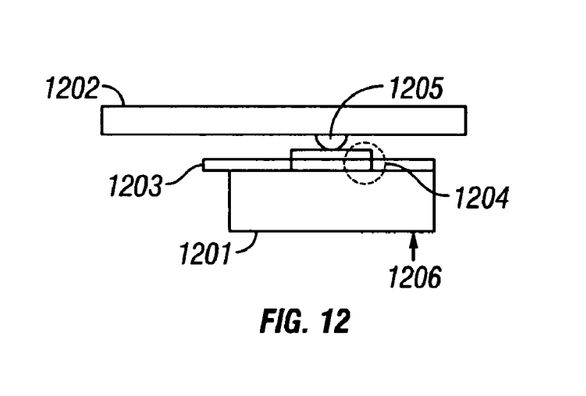
FIG. 12 depicts an exemplary piezoelectric pressure sensor that can be used for determining the optimum bias voltage that should be applied between a slider body according to the present invention.
Figure 13:
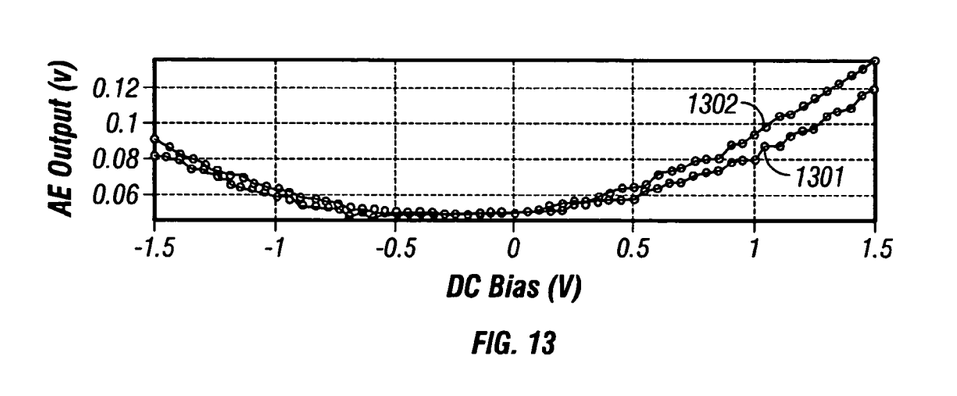
FIG. 13 shows the output of an AE sensor for an exemplary slider as a function of an applied bias voltage having a DC component and a swept-frequency AC component.

A fifth embodiment of the present invention provides that the optimum DC bias voltage that should be applied between a slider body and a disk is detected by identifying the maximum slider-disk spacing by using a piezoelectric (PZT) sensor. FIG. 12 shows a side view of an exemplary arrangement of a slider body 1201, a suspension 1202 and a flexure 1203 having an exemplary piezoelectric pressure sensor 1204 for sensing pressure that flexure 1203 exerts against suspension 1202 at a dimple 1205 as slider body 1201 contacts a disk (not shown) at 1206. Piezoelectric pressure sensor 1204 is fabricated as an integral part of flexure 1203, such as disclosed by co-pending and commonly assigned patent application Ser. No. 10/664,295 and patent application Ser. No. 10/664,296 both of which are incorporated by reference herein. Piezoelectric pressure sensor 1204 detects head-disk interference (HDI) when slider body 1201 contacts a disk (not shown in FIG. 12). When the flying height of slider body 1201 is maximum, that is, at the design flying height of the slider, the output of piezoelectric pressure sensor 1204 is a minimum. According to an alternative configuration of the fourth embodiment of the present invention, an acoustic emission (AE) sensor can be used instead of a piezoelectric pressure sensor, in which case detection of the maximum flying height of the slider would occur when the output of the acoustic emission sensor is a minimum. FIG. 13 shows the output of an AE sensor for an exemplary slider as a function of an applied bias voltage having a DC component. Curve 1301 represents the output of the AE sensor after 20 minutes. Curve 1302 represents the output of the AE sensor after 17 hours.

Figure 11:
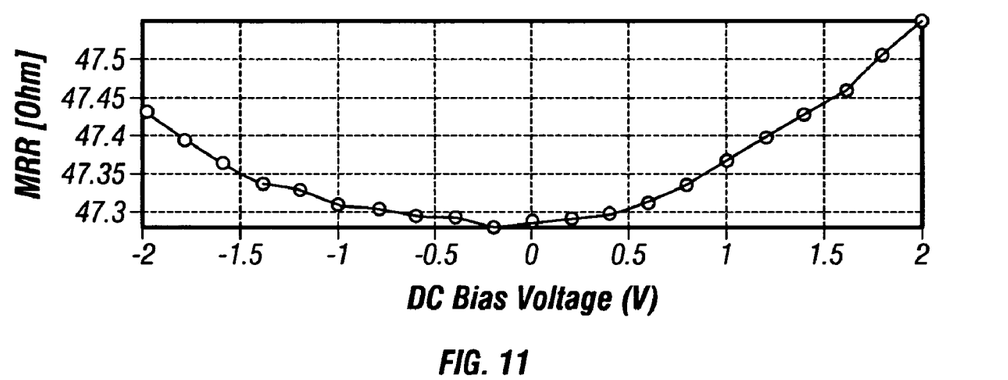
FIG. 11 shows a graph of resistance of an exemplary GMR sensor as a function of applied DC bias voltage.

Note that the point of minimum resistance for the GMR sensor shown in FIG. 11 and the point of minimum output of an AE sensor are not as distinctly defined as the detected point of minimum displacement from the design flying height that is shown in FIG. 7. Thus, the Kelvin probe-based embodiments of the present invention provide a superior technique for determining the optimum DC bias voltage that should be applied between a slider body and a hard disk than the embodiments of the present invention that are based on detecting a minimum interference between a slider body and a hard disk.

The bias voltage applied between a slider body and a disk can be controlled by a feedback loop that adjusts the DC component $V_{DC}$ of the applied bias voltage to keep $A\sin\theta$ near zero, in which A is the amplitude of the slider-disk spacing variation at $\omega$ and $\theta$ is the phase difference between the slider-disk spacing variation at $\omega$ and the AC component $V_0\sin\omega t$ of the applied bias voltage.

Figure 14:
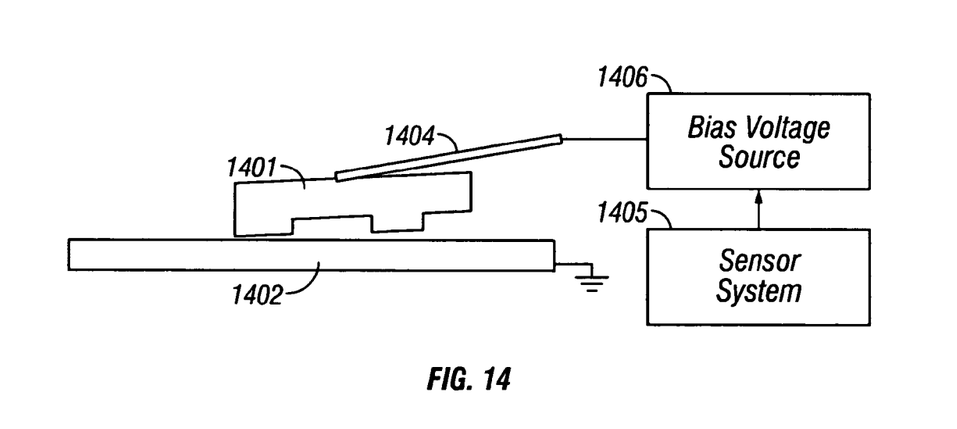
FIG. 14 depicts an exemplary control system for applying the optimum DC bias voltage between a slider body and a hard disk according to the present invention.

Further, a control loop that determines the optimum $V_{DC}$ bias voltage that should be applied between a slider body and a disk can be based on any of the five alterative embodiments of the present invention for determining the optimum DC bias voltage that should be applied to a slider body for eliminating an electrical potential difference between a slider body and a hard disk. FIG. 14 depicts an exemplary control system 1400 for applying the optimum DC bias voltage between a slider body 1401 and a hard disk 1402 according to the present invention. Control system 1400 includes a sensor system 1405 that senses the electrodynamic response of slider body 1401 to an applied AC bias voltage and/or a level of interference between slider body 1401 and hard disk 1402 using any of the techniques described in connection with the present invention. Sensor system 1405 outputs a control signal that corresponds to the sensed electrodynamic response of slider body 1401 and/or the level of interference between slider body 1401 and hard disk 1402. A bias voltage source 1406 outputs a bias voltage in response to the control signal that is applied to slider body 1404.

It should be understood that while the present invention has been described in terms of a single slider body and a single disk, the techniques of the present invention can be applied to each respective slider-disk interface of an HDD individually or collectively. That is, the optimum bias voltage for each respective slider-disk interface can be detected separately. Alternatively, the optimum bias voltage for a single slider-disk interface can be detected and used for generating a bias voltage that is applied to each respective slider-disk interface. Accordingly, any of the techniques of the present invention for determining the optimum DC bias voltage that should be applied between a slider body and a hard disk described herein can be used in a control loop to control the applied DC bias voltage. Further, the techniques of the present invention can also be applied to magneto-optical drives or optical drives that contain a slider having an aperture/lens and a rotating disk.

While the present invention has been described in terms of applying an AC/DC bias voltage to a slider body, it should be understood that the present invention works equally well when an AC and/or DC bias voltage are applied to the disk instead of the slider body. Further, while the present invention has been described in terms of varying the DC bias voltage from a negative value to a positive value, the range over which the DC bias voltage could be varied could be unipolar, in which case the optimum DC bias voltage would be determined by linearly extrapolating the detected deviation from the design flying height of the slider to find the intercept with the x-axis.

Although the present invention has been described in terms of determining an optimum bias voltage that should be applied between a slider body and a disk for eliminating an electrical potential difference that exists between the slider body and the disk, it should be understood that the Kelvin probe aspects of the present invention can be used for detecting the condition or state of a slider-disk interface as it varies over time. For example, the optimum bias voltage can be determined using any of the embodiments of the present invention and used as a baseline against which subsequent detected changes in the optimum bias voltage are used for determining, for example, the amount of lubricant that is present at different areas of the disk. Furthermore, because the contact potential is sensitive to fermi-level changes and to changes of the surface potential, the present invention can be used to monitor lubricant degradation or drive contamination.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A hard disk drive, comprising:
   at least one hard disk;
   at least one slider corresponding to each disk;
   a bias voltage source applying a predetermined bias voltage between a slider body and the corresponding hard disk, the predetermined bias voltage including a DC component and an AC component and being based on a flying-height spacing of the slider body.

2. The hard disk drive according to claim 1, wherein the predetermined bias voltage is based on a minimum slider-to-disk clearance change from a design flying height of the slider at a frequency of the AC component as the DC component of the predetermined bias voltage is varied.

3. The hard disk drive according to claim 1, wherein the predetermined bias voltage is based on a minimum electro-dynamic response of the slider to a first harmonic of the AC frequency of the AC component as the DC component is varied.

4. The hard disk drive according to claim 1, wherein the flying-height spacing of the slider body is detected using a Laser Doppler Vibrometer.

5. The hard disk drive according to claim 1, wherein the flying-height spacing of the slider body is detected by a read element on the slider body sensing a magnetic readback signal at a frequency of the AC component as a magnitude of the DC component is varied.

6. The hard disk drive according to claim 5, wherein the AC component is a swept-frequency AC signal.

7. The hard disk drive according to claim 5, wherein the AC component is a single-frequency AC signal.

8. The hard disk drive according to claim 5, wherein the detected magnetic readback signal is a Position Error Signal relating to a position of the slider body with respect to the hard disk.

9. The hard disk drive according to claim 1, wherein the predetermined bias voltage is based on a minimum interference between the slider body and the hard disk as the DC component is varied.

10. The hard disk drive according to claim 1, wherein the predetermined bias voltage is applied to the slider body with respect to the hard disk.

11. The hard disk drive according to claim 1, wherein the predetermined bias voltage is applied to the hard disk with respect to the slider body.

12. The hard disk drive according to claim 1, wherein the bias voltage source controls a magnitude of the predetermined voltage bias on the detected flying-height spacing of the slider body.

13. The hard disk drive according to claim 12, wherein the predetermined bias voltage is based on a minimum slider-to-disk clearance change from a design flying height of the slider at a frequency of the AC component as the DC component is varied.

14. The hard disk drive according to claim 12, wherein the predetermined bias voltage is biased on a minimum interference between the slider body and the hard disk at a frequency of the AC component as the DC component is varied.

15. A hard disk drive, comprising:
    at least one hard disk;
    at least one slider corresponding to each disk;
    a bias voltage source applying a predetermined bias voltage between a slider body and the corresponding hard disk, the predetermined bias voltage including a DC component that is based on a minimum variation of current that flows on and off the slider body as the DC component is varied.

16. A hard disk drive, comprising:
    at least one hard disk;
    at least one slider corresponding to each disk;
    a bias voltage source applying a predetermined bias voltage between a slider body and the corresponding hard disk, the predetermined bias voltage including a DC component and being based on a detected level of interference between the slider body and the hard disk.

17. The hard disk drive according to claim 16, wherein the slider includes a magnetoresistive element, and wherein the detected level of interference between the slider body and the hard disk is based on a minimum resistance of the magnetoresistive element as the Dc component is varied.

18. The hard disk drive according to claim 16, wherein the detected level of interference between the slider body and the hard disk is based on an output of a piezoelectric sensor sensing contact between the slider body and the hard disk as the DC component is varied.

19. The hard disk drive according to claim 16, wherein the detected level of interference between the slider body and the hard disk is based on an output of an acoustic emission sensor sensing contact between the slider and the hard disk as the DC component is varied.

20. The hard disk drive according to claim 16, wherein the predetermined bias voltage is applied to the slider body with respect to the hard disk.

21. The hard disk drive according to claim 16, wherein the predetermined bias voltage is applied to the hard disk with respect to the slider body.

22. The hard disk drive according to claim 16, wherein the bias voltage source controls a magnitude of the predetermined voltage based on the detected level of interference between the slider body and the hard disk.

* * * * *